Figure 7:
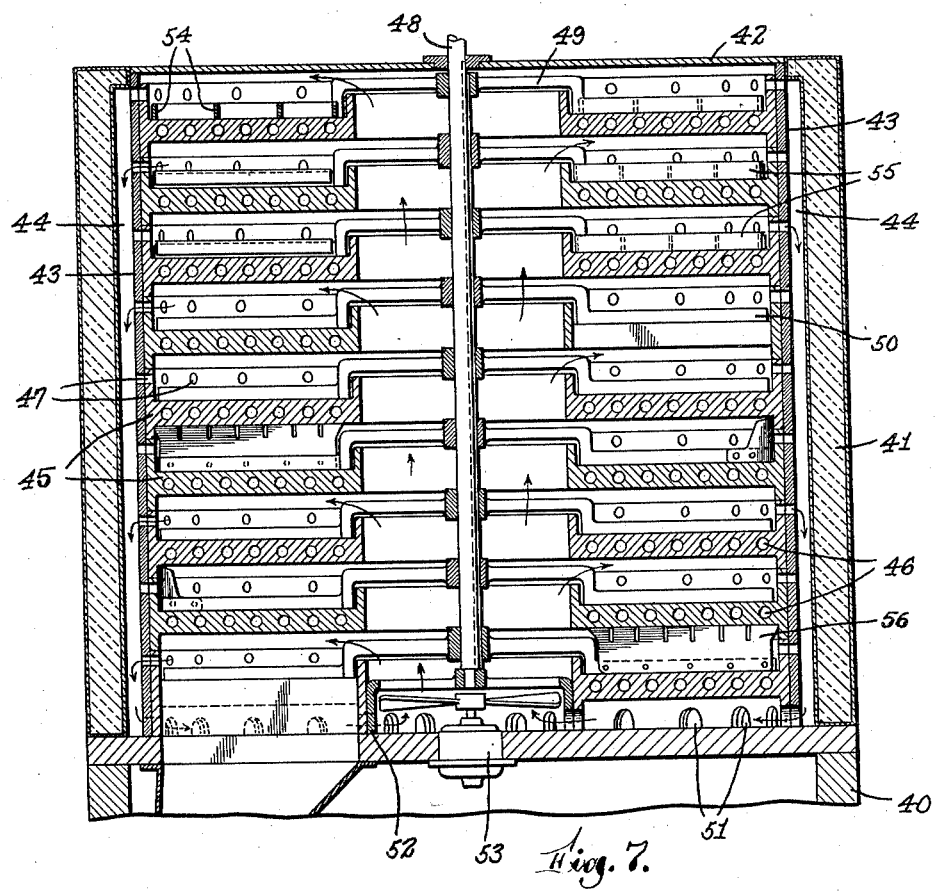

Jan. 14, 1941.                    C. BIRDSEYE                    2,228,998
                            REFRIGERATING APPARATUS
                    Filed July 25, 1938          6 Sheets-Sheet 1
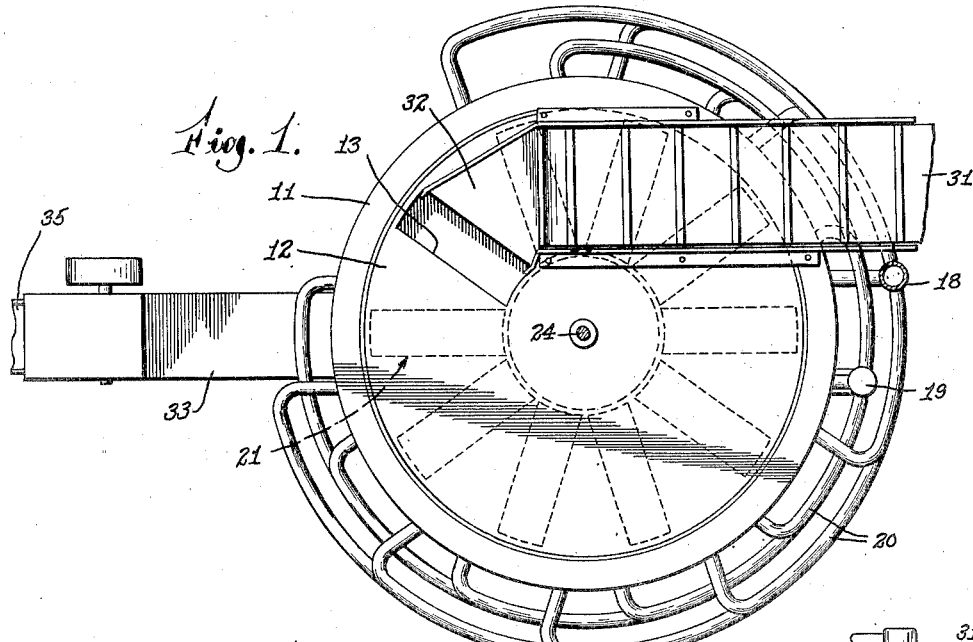
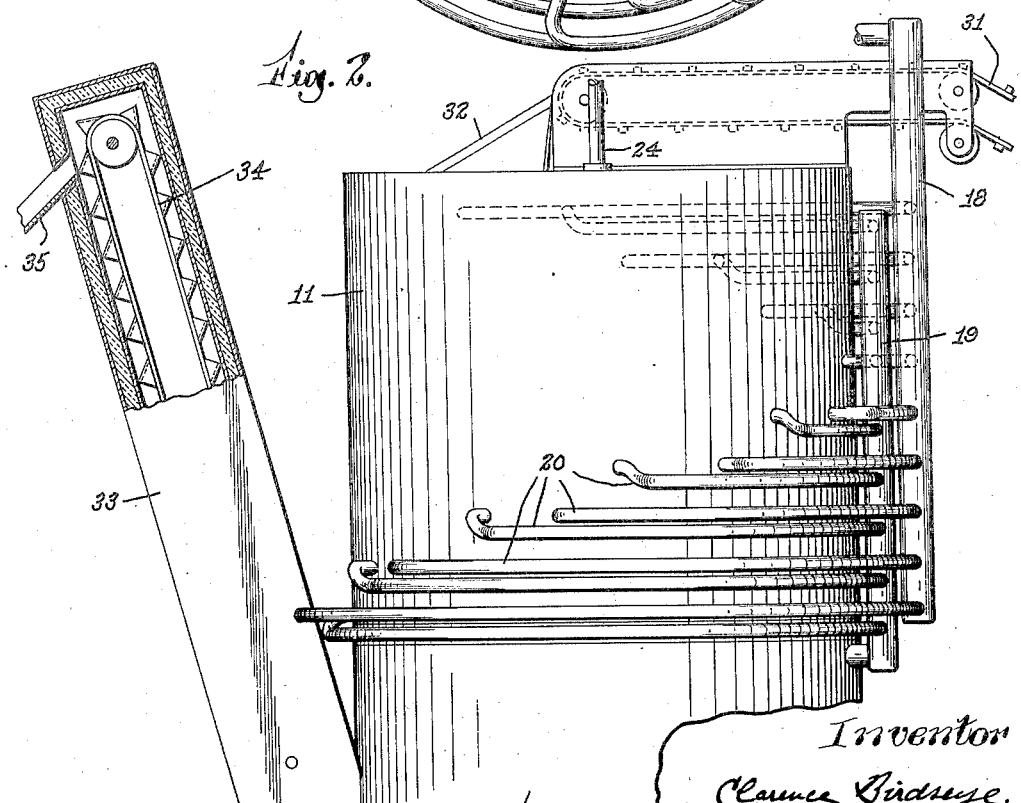
Inventor
Clarence Birdseye.
by Henway & Witter
Attorneys Jan. 14, 1941.     C. BIRDSEYE     2,228,998
REFRIGERATING APPARATUS
Filed July 25, 1938     6 Sheets-Sheet 2
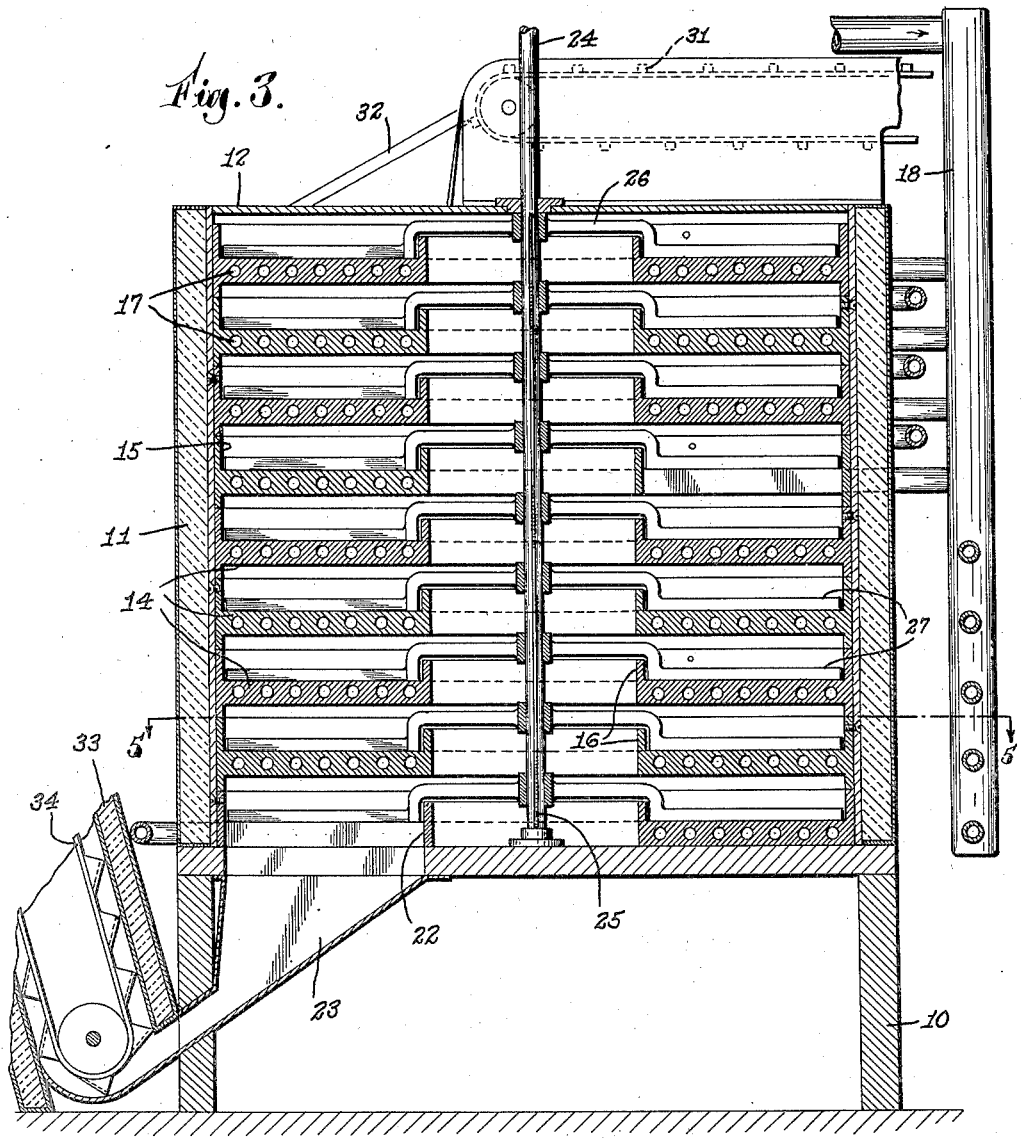

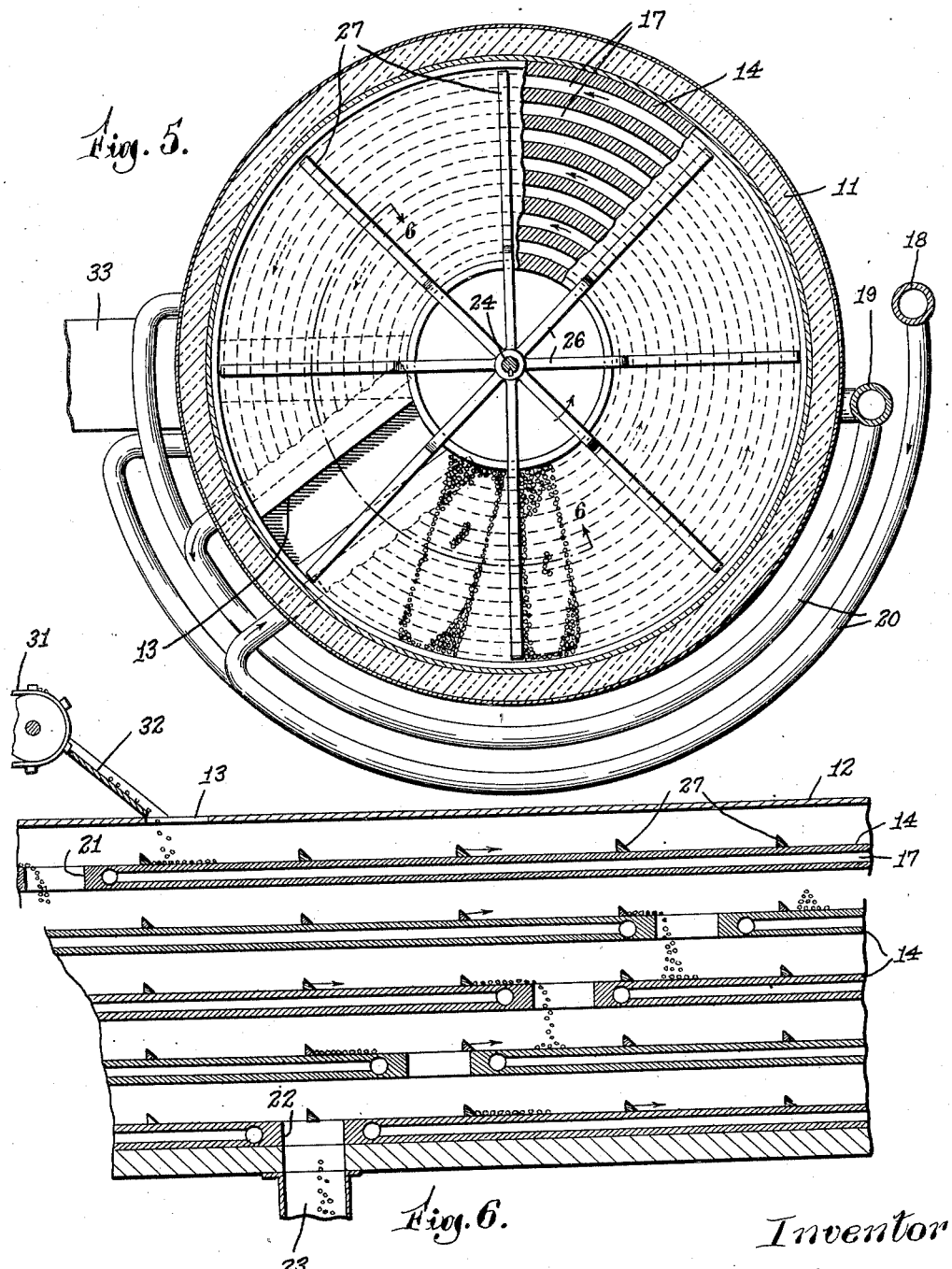

Jan. 14, 1941.　　　　C. BIRDSEYE　　　　2,228,998
REFRIGERATING APPARATUS
Filed July 25, 1938　　　　6 Sheets-Sheet 4

Inventor
Clarence Birdseye
by Fenway & Witter
Attorneys

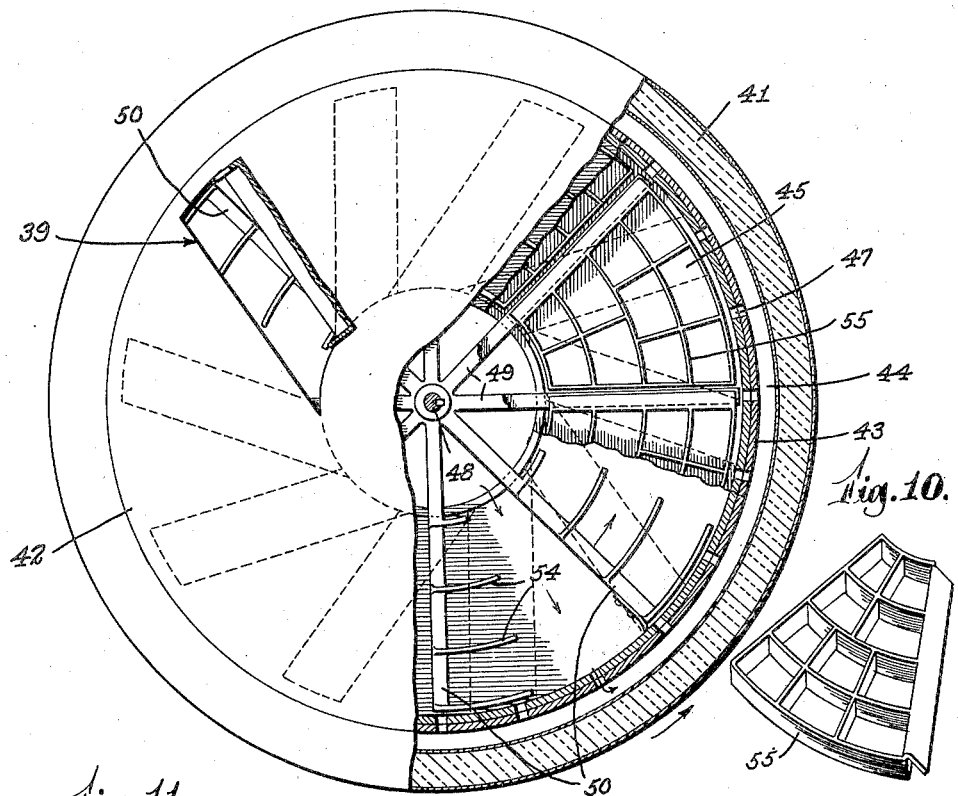
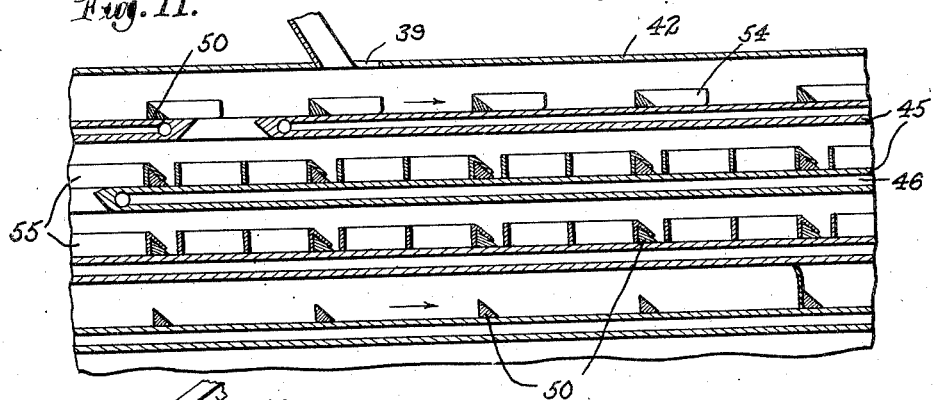
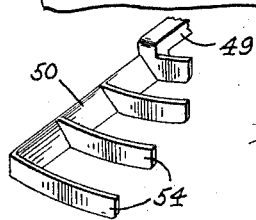

Jan. 14, 1941.   C. BIRDSEYE   2,228,998
REFRIGERATING APPARATUS
Filed July 25, 1938   6 Sheets-Sheet 6

Inventor
Clarence Birdseye
by Henway & Witter
Attorneys

Patented Jan. 14, 1941

2,228,998

UNITED STATES PATENT OFFICE 2,228,998

REFRIGERATING APPARATUS

Clarence Birdseye, Gloucester, Mass., assignor to Mechanical Research, Inc., Providence, R. I., a corporation of Rhode Island Application July 25, 1938, Serial No. 221,041

13 Claims. (Cl. 62—99)

This invention relates to refrigerating apparatus adapted primarily for freezing, quick-freezing or chilling food products in bulk. It includes also within its scope the novel and useful process herein shown as carried out with the assistance of the apparatus of my invention and which is characterized by moving the product to be frozen, while maintained in substantially uniformly distributed condition, across or over refrigerating surfaces disposed at different levels and causing the product to be transferred from one to another surface.

Efficient refrigerating apparatus is now available for treating food products packaged before being frozen, and in such apparatus the packaged product is usually engaged between continuously refrigerated heat-conductive members which insure uniform and rapid withdrawal of heat from the unit packages. It is sometimes desirable, however, to freeze food products in bulk and for that purpose there is a demand for refrigerating apparatus adapted for continuous operation upon various food products in bulk form. One object of the present invention is to solve this problem and to provide apparatus to which such food products as vegetables, berries, small fruit, as well as fish and meat products may be fed continuously and automatically in their fresh, moist condition, quick-frozen in their progress through the apparatus and delivered in frozen condition to be subsequently packed in containers of any desired or convenient size. To this end an important feature of my invention consists in refrigerating apparatus comprising a series of freezing shelves or plates in combination with means for moving a product to be frozen progressively across the surface of one plate after another, while substantially uniformly and preferably thinly distributed thereon, thus converting the product to frozen condition within a short interval of time and within an apparatus of compact and convenient size.

The precise arrangement of the freezing shelves is of secondary importance since this general type of apparatus has been used heretofore for various heat transfer processes. In a preferred construction which is herein illustrated, the shelves are shown as arranged one above another and as annular in shape. In such apparatus the product may be delivered to the uppermost freezing shelf or plate, moved circumferentially across its surface in a controlled manner and delivered through a discharge opening to the next lower plate. The number of plates may be selected in accordance with the requirements of the work in hand, and the temperature of the plates may be correspondingly regulated. Preferably and as herein shown the fresh product may be delivered by conveyor mechanism to the top of the apparatus and the frozen product drawn out from the lower portion of the apparatus. Where this is done it is desirable to provide a discharge chute and a conveyor extending substantially to the level of the top of the apparatus in order to prevent continuous waste of refrigerated air or gas from the system.

Another feature of my invention consists in means for circulating refrigerated air over the product as it is advanced upon the refrigerating shelves or plates of the apparatus. This improves the efficiency of the freezing operation and may be conveniently effected by the provision of a suitably placed blower and passages or ducts for refrigerated air to be circulated.

Serious problems of operation arise from the tendency of frost to deposit upon the refrigerated surface of the apparatus and because of the tendency of the fresh product to freeze to parts of the apparatus before the surface of the product has been congealed. From this aspect an important feature of the invention consists in providing product-moving devices which are arranged for both movement across the surface of the refrigerating plates, and for free movement away from the plates, so that they may lift to clear frozen deposits which may accumulate on the plates and walls or otherwise arrest free normal movement of the feeding devices. As herein shown the product is moved across the surface of the respective plates by substantially radial arms connected to a common operating shaft and for the purpose discussed, these arms are so connected to the operating shaft that they may rise or fall thereon as occasion requires.

The product-moving arms as herein shown, are provided with metallic shoes which act somewhat as scrapers upon the refrigerating plates. Above the shoe the arms are provided with an inclined product-engaging face which is of material of low thermal conductivity such as balsa wood, and to which a fresh, moist product is not likely to become attached by freezing.

Another feature of the invention may consist in providing the product-moving arms with supplementary means for maintaining a substantially uniform distribution of the product in its movement upon the refrigerated plates. As herein shown this is conveniently effected by providing radial product-moving arms with spaced projections which prevent the product from drifting toward the periphery of the apparatus, or by filling the space between the arms with an openwork grill which is found even more positive in maintaining the desired uniform and shallow distribution of the product.

An important advantage of the present invention is that it may be adapted readily for freezing orange juice, milk or other liquid product, or any product which, like orange juice, may best be frozen under non-oxidizing conditions or under conditions of reduced pressure. For such purposes the apparatus of my invention may be sealed and connected to a vacuum pump or a source of inert gas and a raw liquid product may be supplied by a spraying device located above one of the uppermost freezing plates. The liquid product introduced into the apparatus may be thus congealed or partially congealed by contact with the uppermost plate of the series and may be completely frozen in its passage upon and across the lower plates of the series in the manner already explained.

The apparatus of my invention may also be utilized for quick-freezing food products in an inert gas atmosphere by providing it with a receptacle for dry ice which will permit vaporized $CO_2$ gradually to rise in the apparatus and displace the air originally contained therein. This procedure not only eliminates oxidation of the product but materially assists the efficiency of quick-freezing process as carried out in the apparatus.

Figure 8:
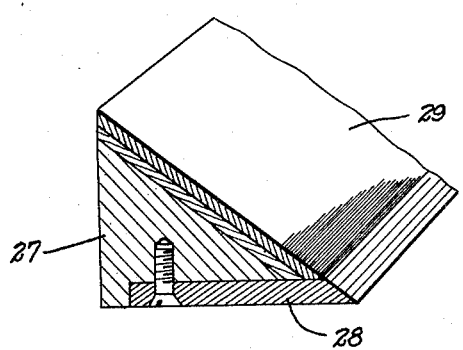
Figure 13:
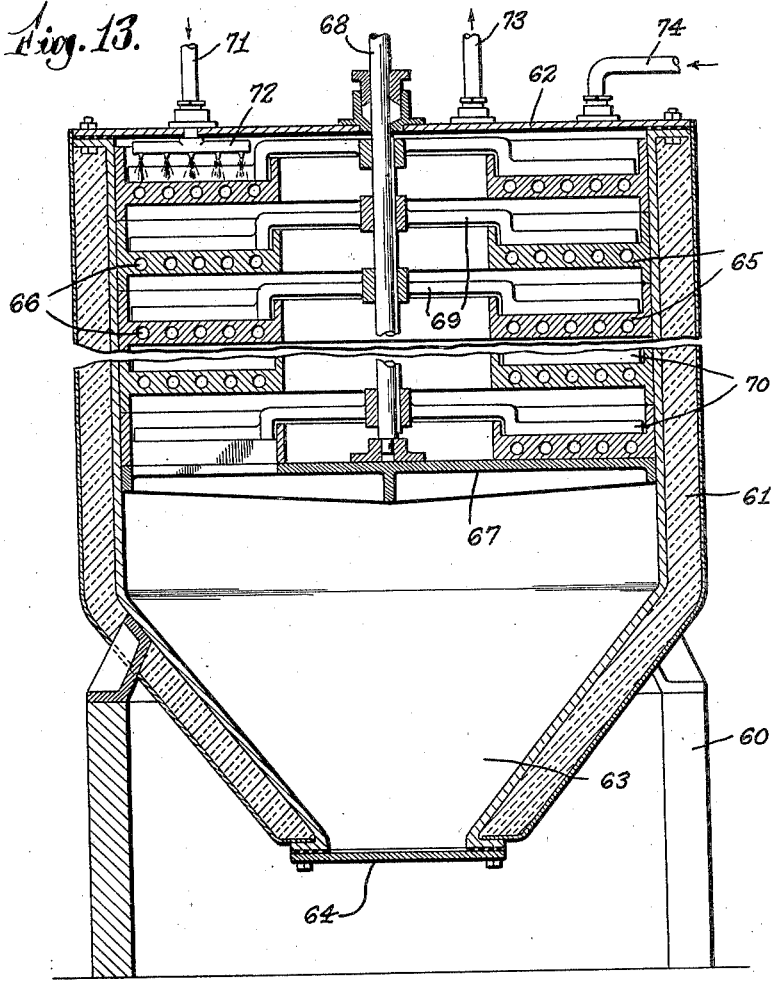
Figure 14:
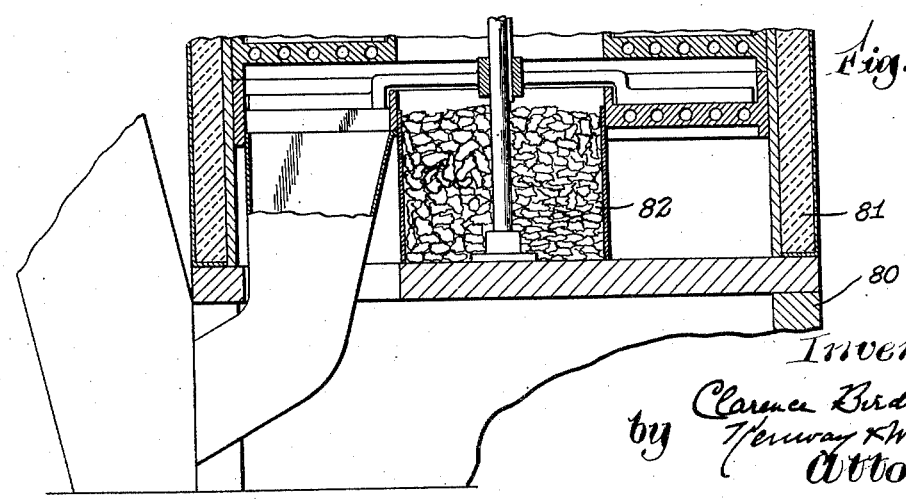

These and other features of the invention will be best understood and appreciated from the following description of certain preferred embodiments thereof, selected for purposes of illustration and shown in the accompanying drawings in which, Fig. 1 is a view of the apparatus as seen from above, Fig. 2 is a view in elevation, Fig. 3 is a view in vertical section, Fig. 4 is a fragmentary view in perspective partly in section, Fig. 5 is a sectional view on the line 5—5 of Fig. 3, Fig. 6 is a fragmentary view in circumferential section on an enlarged scale on the line 6—6 of Fig. 5, Fig. 7 is a view in longitudinal section of apparatus modified by the addition of an air circulating system, Fig. 8 is a fragmentary view in perspective of one of the product feeding arms, Fig. 9 is a view of the apparatus shown in Fig. 7 as seen from above, Fig. 10 is a view in perspective of a product distributing device which may be employed with certain plates of the apparatus, Fig. 11 is a fragmentary sectional view in circumferential section on an enlarged scale of the apparatus of Fig. 9, Fig. 12 is a fragmentary view in perspective of one of the feeding arms employed with the uppermost plate, Fig. 13 is a view in longitudinal section of apparatus modified for handling a liquid product, and Fig. 14 is a fragmentary view in section showing the apparatus as equipped with a dry ice receptacle.

The apparatus in its preferred form and as illustrated in Figs. 1–6 comprises a cylindrical base section 10 which supports a vertically disposed cylindrical casing 11 including heat in-
sulating material in the structure of its walls. The base section 10 not only supports the insulated casing at a convenient height but furnishes convenient space for the compresser of a refrigerating system. This may be a commercial unit and is not herein shown since its details are not necessary for a complete understanding of the invention. The casing is closed by a circular cover 12 which may be removed to permit access to the interior of the apparatus. The cover is provided with a delivery opening 13 disposed substantially radially therein and through which the fresh unfrozen product is supplied continuously to the apparatus.

The casing 11 contains a series of annular plates or shelves 14 supported vertically one above another and provided with relatively staggered openings so that the product may be passed downwardly in the apparatus from plate to plate as will presently be described. Each of the plates 14 is provided with an outer circumferential flange 15, herein shown as integral with the body of the plate but not necessarily so formed, and the plates are assembled one above another in a vertical stack within the casing 11. The flanges 15 register and support the plates in spaced relation, there being a distance of perhaps three inches between the top surface of one plate and the bottom of the next superposed plate. Each of the plates is also provided with an inner circular flange 16 of less height than its outer flange 15. The two flanges as will be seen define an open, flat circular face or freezing zone in each plate. The plates themselves may be of aluminum or other heat conductive alloy and each is provided with a series of parallel circumferential passages 17 for brine, ammonia vapor or other refrigerant. These passages are included in a circulating system with headers 18 and 19, and curved connecting pipes 20. Further details of the refrigerant circulating system are not shown since commercial apparatus may be largely utilized and for purposes of the present invention it is necessary only that means be provided for continuously circulating an efficient refrigerant through the plates 14 so that their temperature is reduced to the degree required for the particular work in hand.

In the illustrated apparatus a series of nine annular plates 14 is shown. The number of plates may be varied and the capacity of the apparatus thus governed, but in all cases it will be understood that a particularly compact and convenient arrangement is presented wherein the space between the plates has been reduced to a minimum consistent with progress of the product through the apparatus. There is no waste space between the plates and the efficiency of each plate is improved by the close proximity of adjoining refrigerated plates. The delivery opening 13 in the cover, as shown in Fig. 1, is located in what may be termed for convenience, a 10 o'clock angle position and accordingly the product to be frozen reaches the uppermost plate directly beneath this opening. The uppermost refrigerating plate 14 is provided with a similar opening 21 located in staggered relation with respect to the opening 13 and in what may be termed a 9 o'clock angle position. Similarly each of the lower plates is provided with an opening disposed about 30° in counter-clockwise direction beyond the opening in the plate directly above it. The lowermost plate 14 is provided with an opening 22 registering with a discharge chute 23 which passes outwardly and downwardly through the base section 10 of the apparatus, as best shown in Fig. 3.

The apparatus is provided with a vertical shaft 24 disposed concentrically at the center of the casing 11 in the central opening of the plates and driven slowly in a counter-clockwise direction by any convenient means. The shaft is provided with a long spline or key 25 and carries a series of spiders 26 one above another and each terminating in radial product-feeding arms 27 which ride upon the surfaces of the respective plates 14. The arms 27 are thus maintained by the weight of the spider in contact with the refrigerated face of the plates, but are free to be displaced upwardly if frost or other obstruction is encountered upon the surface of the plates. The illustrated construction constitutes merely one way of providing free lifting movement for the product-feeding arms and any desired mechanical connection may be utilized for this purpose. As herein shown each spider 26 carries eight product-feeding arms 27 and these are spaced radially and uniformly about the shaft 24. As will be presently explained, the function of these arms is to sweep the product along the surface of the plates from the point of reception to the discharge opening through which the product passes to the next lower plate in the series and so on until the frozen product passes out through the discharge chute 23.

Each product-feeding arm 27 is offset downwardly from its spider 26 and is provided with a metallic shoe 28 and an inclined surface of balsa wood 29 or other non-conductive material, as shown in Fig. 8. The arms 27 may be curved longitudinally as suggested in Fig. 4 to prevent the product from tending to pile up against the outer circumferential flange of the plates. The purpose of the metallic shoe 28 is to scrape and loosen the product which might otherwise become temporarily frozen to the face of the plate and having thus dislodged it, to pass it along to the non-heat-conductive face 29 whereon there is no danger of the product being frozen.

Fresh, unfrozen product may be supplied to the delivery opening 13 in the cover of the apparatus by a conveyor belt 31 which is shown as guided by suitable guide rolls and arranged to discharge by an inclined chute 32 into the delivery opening 13. The conveyor 31 itself may extend to an inspection table whereon the product is given a final inspection before it enters the refrigerating apparatus. The speed of the conveyor 31 is properly regulated with reference to the speed of the shaft 24 carrying the product-feeding arms.

The apparatus preferably includes a delivery chute 33 which is herein shown as being upwardly and outwardly inclined and in which runs a bucket conveyor 34 receiving the frozen product directly from the chute 23. The chute 33 is closed, preferably heat-insulated and extends to a point at least as high as the cover of the apparatus where it is provided with an outlet 35 through which the frozen product passes to the bulk container in which it is to be distributed. The delivery chute is designed in the manner described in order that the refrigerated air contained within the apparatus may not have a tendency constantly to syphon out as it would if the outlet of the discharge chute were to be located at a level below the top of the apparatus. In other words, the chute 33 is designed to contain a column of cold air balancing that contained within the casing 11.

In the apparatus illustrated in Figs. 1-6 there is no special provision shown for the circulation of cold air within it. It is contemplated however, that this apparatus may be equipped with such a system and in Figs. 7-9 one form of satisfactory construction is suggested which may be used with good advantage. As therein shown, the base section 40 supports a cylindrical casing 41 having a cover 42 and a spaced inner wall 43 located to provide an annular air space 44 within the casing 41. A series of flanged refrigerating plates 45 fits within the inner wall 43, the plates, as before, being provided with inner and outer circumferential flanges and with circumferential passages 46 for a refrigerant.

In the illustrated apparatus the outer flanges of the plates 45 are provided with perforations 47 registering with similar perforations in the inner wall 43 and thus leading into the air space 44. The shaft 48 is disposed concentrically within the apparatus and provided with a series of spiders 49 carrying radial product-moving arms 50 which rest on the surface of the refrigerating plates 45. The uppermost plate of the series is spaced below the cover 42 of the apparatus and the lowermost plate is provided with large circumferencial air ports 51 registering with similar passages in the inner wall 43. The shaft 48 is journaled at its lower end in a bridge member 52 and beneath this is located a motor driven blower 53 by which a current of air is forced continuously upwardly around the shaft 48, outwardly over the refrigerating plates and downwardly through the outer air space 44. Thus there is provided a continuous circulation of the chilled air contained within the apparatus over the product being treated.

The receiving opening 39 in the cover 42 and the openings in the plates 45 are shown as being disposed substantially tangentially with respect to the inner flange of the plates instead of being radially disposed as in the apparatus of Figs. 1-6. The angular relation of these openings with respect to the radial arms 50 is advantageous in that the plates afford continuous support for the arms in their rotary movement and thus obviate any tendency of the arms to drop into or catch in the openings.

It is important to maintain the product spread out and uniformly distributed in a thin layer upon the freezing plates in order to insure effective and uniform freezing action. To this end the feeding arms may be provided with projections or baffles or with an interposed grill, all tending to advance the product under conditions favorable for freezing. As shown in Fig. 12 the arms 50 are provided with a series of circumferentially curved branches 54 extending forwardly and tending to hold the product in definite restricted zones upon the plates 45 and prevent it from piling up against the outer flange. The branches 54 may be of any desired height, but preferably about that of the arms from which they project and they may be carried by all of the feeding arms or by some of them only.

In Fig. 10 is illustrated a removable grill 55 arranged to fit between any two adjacent arms 50. The lateral walls of the grill are circumferentially curved and its construction is such as to catch the product as delivered and maintain it in uniformly distributed condition between adjacent arms. As shown in Fig. 11 the product feeding arms 50 of the upper plate may be equipped with branches 54 while the arms of the lower plates in the series may be equipped with grills 55 or the arrangement may be varied to secure the best results in accordance with the degree of congelation reached by the product at the successive plates.

In Fig. 13 the apparatus is illustrated as modified to treat a liquid product, such as orange juice, which it is desired to quick freeze under non-oxidizing conditions. Accordingly the apparatus is provided with a normally closed cylindrical casing 61 having heat insulating material in its walls. The casing has a hopper bottom 63 and the whole structure is supported by a cylindrical base section 60. The casing is fitted with an air-tight cover 62 and the hopper may be closed by an air-tight plate 64. The casing is provided with a supporting plate 67 upon which rests a series of flanged refrigerating plates 65 which may be annular in shape and each provided with passages 66 for the circulation of a refrigerant. A central shaft 68 is journaled upon the supporting plate 67 and passes through the openings in the plate 65 and out through the cover 62 where it is provided with a stuffing box. The shaft is provided with a long key or feather and carries a series of spiders 69 one for each refrigerating plates 65 and the spiders terminate in product-moving arms 70 traveling between the circumferencial flange of the plates.

The liquid product to be frozen may be supplied continuously in the form of a spray delivered within the casing and above the uppermost freezing plate 65 of the series. As herein shown a supply pipe 71 passes through the cover 62 and is provided with a transversely arranged spray head 72 arranged to discharge the liquid into the space above the uppermost plate. The cover 62 is also provided with a connection 73 to a vacuum pump and an independent connection 74 to a source of inert gas. By proper utilization of these connections the interior of the casing may be maintained under partial vacuum during its operation, or it may be filled with an inert gas such as nitrogen or $CO_2$ and the freezing operation thus carried out under non-oxidizing conditions.

It will be understood that the liquid delivered in spray form above the uppermost plate is at once partly congealed and is advanced by the product feeding arms in the form of slush or granules to the discharge opening of the plate. It then falls upon the next lower plate and so on until it reaches the hopper bottom of the casing in completely frozen and unoxidised condition. It is there collected until the hopper bottom is substantially full, whereupon the plate 64 is temporarily removed and the contents of the hopper packed off for distribution in suitable containers.

In Fig. 14 the apparatus is illustrated as provided with a receptacle 82 for containing a quantity of dry ice which may be supplied for the purpose of increasing the freezing efficiency of the apparatus and also as a means for supplying an inert gas to prevent oxidation of the product. In this figure the casing 81 is represented as supported by a bottom section 80 and is provided with a concentrically arranged cylindrical container 83 for the dry ice. As the dry ice vaporizes $CO_2$ gas will gradually fill the apparatus and displace the air originally contained or the air may be pumped out and vaporization thus facilitated.

The apparatus of my invention has been described in connection with a novel process of freezing food products in bulk and it is this field in which I am primarily interested. However, it will be understood that the apparatus may be usefully employed for carrying out any process of treating food where heat interchange is desired, for example, in desiccating milk. It should be understood therefore that the foregoing disclosure is illustrative only and not limiting in its purpose.

In its broader aspects the invention herein disclosed is claimed in my copending application Ser. No. 264,793, filed March 29, 1939.

Having thus disclosed my invention I claim as new and desire to secure by Letters Patent:

1. Freezing apparatus including in its structure a series of plates disposed at different levels and spaced by circumferential flanges extending upwardly and downwardly from the bodies of the respective plates, means for refrigerating the plates, and means for moving a product to be frozen across the surface of one plate after another.

2. Freezing apparatus including in its structure an outer insulating casing enclosing a series of refrigerated plates arranged one above another with spaces between them, means for delivering to one of the uppermost freezing plates of the series a product to be frozen, and movable means for holding the product in thinly distributed condition upon the refrigerated surface thereof and for advancing it across the surface of the plate while so distributed.

3. Freezing apparatus having a series of stationary annular plates arranged concentrically one above another and each having a discharge opening therein, means for refrigerating the plates, means for delivering a product to be frozen to an upper freezing plate, and means for moving the product upon each plate in a circular path to the discharge opening of such plate while the product is held in uniformly distributed condition on the surface of such plate.

4. Freezing apparatus including in its structure an upright closed casing having a series of stationary circular refrigerated shelves therein, means for delivering to an upper shelf a product to be frozen, and means acting to move the product in substantially circular paths in the spaces between the shelves while holding it spread out with substantially uniform distribution on the surface of certain of the shelves.

5. In a freezing apparatus having a series of spaced circular refrigerated plates open at their centers to provide a vertical passage therethrough, a driving shaft located in said passage, and product moving arms for each plate resting with their weight on the respective plates and connected to the shaft to be rotated thereby and to move axially of the shaft.

6. Freezing apparatus having a series of freezing plates arranged one above another with a discharge opening in each leading to the next in the series, and product moving mechanism associated with the plates and comprising a shaft and ars connected to said shaft to be driven thereby and having freedom to move upwardly independently of the shaft in clearing frozen deposits upon the plates.

7. In freezing apparatus having a series of spaced refrigerated plates, product moving means including a grill member for maintaining such product in a spread-out condition as it is advanced across the surface of said plates and in direct contact therewith.

8. In freezing apparatus having a stationary horizontal refrigerated plate presenting a product supporting face, a product-moving arm mounted to sweep across the surface of such plate and having a narrow metal face for separating frozen products from the plate and a non-metallic face for engaging the frozen product after it has been initially so separated.

9. Freezing apparatus for liquid food products, including in its structure, a closed casing, a series of refrigerated plates located therein at different levels, means for spraying the product to be frozen into the space above the uppermost plate of the series, a vacuum connection to the casing effective in the spaces above certain plates, and means for separating the product from the surface of the plates and advancing it from one to another.

10. Freezing apparatus including in its structure a refrigerated plate, means for continuously delivering a product thereto, and product-moving means for catching the product as delivered and confining its movement to certain mechanically defined zones during its movement upon such plate.

11. Freezing apparatus including in its structure a series of refrigerated plates spaced one above another and provided with central openings forming a well in the series of plates, means for advancing a food product across one plate after another, and a receptacle for dry ice or the like located where the dry ice may vaporize into said well and so reach the produce between said plates.

12. Freezing apparatus for liquid food products, including in its structure a closed casing, a series of refrigerated plates located therein at different levels, means for supplying the product to be frozen to one of the upper plates of the series, vacuum connection to the interior of the casing, and means for separating the product from the surface of the plates and advancing it from one plate to another.

13. Freezing apparatus including in its structure a series of refrigerating plates spaced one above another and provided with openings whereby a product to be frozen may fall from one plate to the next, means for advancing such product across one plate after another and to said openings, and a receptacle within the casing for dry ice or the like so located that the dry ice in vaporized form may enter the spaces between the plates and aid in lowering the temperature of the product and in creating a non-oxidizing atmosphere within the apparatus.

CLARENCE BIRDSEYE.